(12) United States Patent
Kirby et al.

(10) Patent No.: US 7,191,117 B2
(45) Date of Patent: Mar. 13, 2007

(54) GENERATION OF SUBTITLES OR CAPTIONS FOR MOVING PICTURES

(75) Inventors: David Graham Kirby, Epsom (GB); Christopher Edward Poole, Reigate (GB); Adam Wiewiorka, London (GB); William Oscar Lahr, London (GB)

(73) Assignee: British Broadcasting Corporation, London (GB)

( * ) Notice: Subject to any disclaimer, the term of this patent is extended or adjusted under 35 U.S.C. 154(b) by 694 days.

(21) Appl. No.: 10/297,692

(22) PCT Filed: Jun. 11, 2001

(86) PCT No.: PCT/GB01/02547
§ 371 (c)(1),
(2), (4) Date: Dec. 6, 2002

(87) PCT Pub. No.: WO01/95631
PCT Pub. Date: Dec. 13, 2001

(65) Prior Publication Data
US 2004/0093220 A1    May 13, 2004

(30) Foreign Application Priority Data
Jun. 9, 2000    (GB)    ................... 0014161.4
Oct. 5, 2000    (GB)    ................... 0024413.7

(51) Int. Cl.
*G06F 17/27*    (2006.01)

(52) U.S. Cl. ......................... 704/9; 704/235
(58) Field of Classification Search ............... 704/235, 704/9
See application file for complete search history.

(56) References Cited

U.S. PATENT DOCUMENTS 4,571,678 A    2/1986    Chaitin (Continued)

FOREIGN PATENT DOCUMENTS

EP    0649114    4/1995

(Continued)

OTHER PUBLICATIONS

Rui et al., "Automatically Extracting Highlights for TV Baseball Programs," Proceedings of the 8th ACM International Conference on Multimedia, ACM Press, pp. 105-115, 2000.*

(Continued)

*Primary Examiner*—Tālivaldis Ivars Šmits
*Assistant Examiner*—Eunice Ng
(74) *Attorney, Agent, or Firm*—Daly, Crowley, Mofford & Durkee, LLP

(57) ABSTRACT

A method for generating subtitles for audiovisual material received and analyses a text file containing dialogue spoken in audiovisual material and provides a signal representative of the text. The text information and audio signal are aligned in time using time alignment speech recognition and the text and timing information are then output to a subtitle file. Colors can be assigned to different speakers or groups of speakers. Subtitles are derived by receiving and analyzing a text file containing dialogue spoken by considering each word in turn and the next information signal, assigning a score to each subtitle in a plurality of different possible subtitle formatting options which lead to that word. The steps are then repeated until all the words in the text information signal have been used and the subtitle formatting option which gives the best overall score is then derived.

4 Claims, 8 Drawing Sheets

U.S. PATENT DOCUMENTS

| | | | |
|---|---|---|---|
| 4,965,763 A * | 10/1990 | Zamora | 704/1 |
| 5,136,655 A | 8/1992 | Bronson | |
| 5,471,239 A | 11/1995 | Hill et al. | |
| 5,649,060 A | 7/1997 | Ellozy et al. | |
| 5,703,655 A | 12/1997 | Corey et al. | |
| 5,815,196 A | 9/1998 | Alshawi | |
| 5,892,843 A * | 4/1999 | Zhou et al. | 382/176 |
| 6,009,196 A * | 12/1999 | Mahoney | 382/176 |
| 6,076,059 A | 6/2000 | Glickman et al. | |
| 6,597,405 B1 * | 7/2003 | Iggulden | 348/553 |
| 6,614,930 B1 * | 9/2003 | Agnihotri et al. | 382/176 |

FOREIGN PATENT DOCUMENTS

| | | |
|---|---|---|
| EP | 0734181 | 9/1996 |
| EP | 0737016 | 9/1996 |
| EP | 0899719 | 3/1999 |
| GB | 2114407 | 8/1983 |
| GB | 2289395 | 11/1995 |
| GB | 2328069 | 10/1999 |
| JP | 9009199 | 10/1997 |
| WO | 9917223 | 4/1999 |

OTHER PUBLICATIONS

Vasconcelos et al., "Statistical Models of Video Structure for Content Analysis and Characterization," IEEE Transactions on Image Processing, vol. 9, No. 1, Jan. 2000.*

: Wactlar et al.; "Intelligent Access to Digital Video: Informedia Project;" Computer; May 1996; pp. 46-52.

: Brown et al.; "Open-Vocabulary Speech Indexing for Voice and Video Mail Retrieval;" ACM Multimedia 96, Boston, MA, US; pp. 307-316.

: Watanabe et al.; "Automatic Caption Generation for Video Data-Time Alignment Between Caption and Acoustic Signal;" *Multimedia Signal Processing, 1999 IEEE 3rd Workshop*, Copenhagen, Denmark, Sep. 13-15, 1000; Piscataway NJ, US, IEEE, US Sep. 13, 1999; pp. 65-70; XP010351716; ISBN: 0-7803-5610-1.

: "Computer-Aided Dialog Synchronization and Subtitle Generation for Video Systems;" *IBM Technical Disclosure Bulletin*; IBM Corp, New York, NY, US; vol. 36, No. 8; Aug. 1, 1993; pp. 119-120.

Stark et al.; "Banes Theorem and Applications;" Probability Random Processes and Estimation Theory for Engineers; Prentice-Hall; Upper Saddle River, NJ, US; vol. Edi-2; pp. 19-21.

: King et al.; Digital Captioning: Effects of Color-Coding and Placement in Synchronized Text-Audio Presentations; *Proceedings of Ed-Media, World Conference of Educational Multimedia and Hypermedia, XX, XX*; Jun. 25, 1994; pp. 329-334.

: Fox et al.; "Learning to Extract and Classify Names from Text;" *Systems, Man and Cybernetics*, 1998; 1998 IEEE International Conference, San Diego, CA US; Oct. 11-14, 1998, New York, NY, US; IEEE, US, Oct. 11, 1998; XP010311001 ISBN: 0-7803-4778-1; pp. 1668-1673.

: "ITC Guidance on Standards for Subtitling, May 1997;" Independent Television Commission, London, England.

* cited by examiner

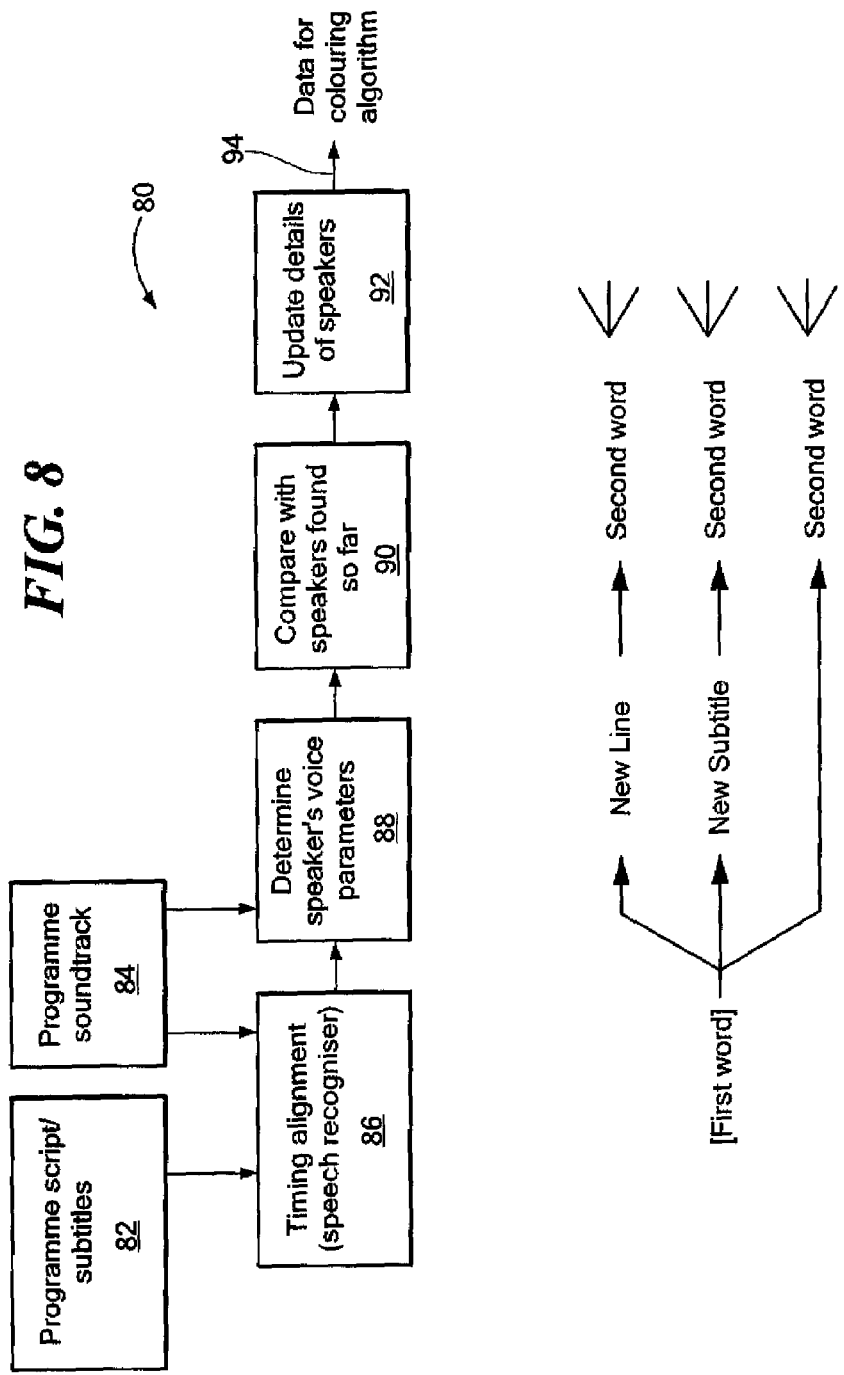

GENERATION OF SUBTITLES OR CAPTIONS FOR MOVING PICTURES

CROSS-REFERENCE TO RELATED APPLICATIONS

This application is a National Stage application of and claims the benefit of PCT Application No. PCT/GB01/02547, filed on Jun. 11, 2001, which claims the benefit of GB Application No. 0024413.7, filed on Oct. 5, 2000, and also claims the benefit of GB Application No. 0014161.4, filed on Jun. 9, 2000, the International Application was published in the English language.

BACKGROUND OF THE INVENTION

This invention relates to a system and method for the generation of subtitles, also known as captions, for moving picture displays, particularly though not exclusively when recorded as video.

Subtitling of broadcast programmes is a very time-consuming process that is traditionally carried out in an entirely manual way. Subtitles are either created prior to a broadcast ('off-line') and then transmitted in synchronism with the programme, or are created live, as the contributors to the programme speak. Typically programmes that are available prior to the day of transmission are subtitled off-line. Other programmes, or live events, such as news bulletins, are subtitled live during the broadcast by stenographers who key the speech as they hear it, using a specialised 'steno' keyboard.

This invention relates primarily to the off-line situation. The traditional approach adopted in creating subtitles is to watch the programme, phrase by phrase, and type in the words of the subtitle, using a conventional keyboard. The user must then set the timings for when the subtitle text is to appear (the 'in-time') and when it is to be removed (the 'out-time') during the programme, so that the text appears on-screen at the right time, in synchronism with the dialogue. The subtitle text must also be formatted appropriately so that it is aesthetically pleasing to the viewer. Numerous guidelines must be followed to achieve the house-style preferred by each broadcaster. A dedicated subtitle editing system is used usually running on a personal computer.

Much of the time taken in preparing subtitles is spent in synchronising the text to the dialogue. If a subtitle appears or ends at a significantly different time from its associated dialogue, then this is distracting for viewers, and even more so for those with hearing impairments who may also be lip-reading. Hence, as the subtitles are being created, significant time is taken in ensuring that this aspect is correct.

As can be seen, current techniques to prepare subtitles are very labour-intensive and time-consuming. It is typical for it to take between 12 and 16 hours for each hour of programme being subtitled.

It has been proposed to use speech recognition to produce the text of what was spoken in an automatic or semi-automatic fashion. However, we have found that this does not work in practice, with even the best currently-available speech recognition techniques. The recordings are not made with speech recognition in mind, and the manner and variety of speech as well as the background noise are such that at times the speech recognition is so poor that the subtitle text is nonsense. Speech recognition has therefore been dismissed as being inappropriate at the present time.

Speech recognition is known for use in a variety of different ways. These include generating text from an audio file (United Kingdom Patent Specification GB 2 289 395A), editing video (Japanese Patent Application 09-091928 of 1997), controlling video (Japanese Patent Application 09-009199 of 1997), indexing video material (Wactlar et al., "Intelligent Access to Digital Video: Infomedia Project" Computer, May 1996, pages 46 to 52; Brown et al., "Open-Vocabulary Speech Indexing for Voice and Video Mail Retrieval", ACM Multimedia 96, Boston, USA, pages 307 to 316; U.S. Pat. No. 5,136,655; and also European Patent Application 649 144A which describes indexing and aligning based thereon), and generating teleprompt displays (UK Patent Application 2 328 069; European Patent Application 649 144A).

A first aspect of this invention is directed to the above-described problem of reliably producing subtitles from an audiovisual recording without the need for so much manual input.

Coloured text also plays an important role in subtitling. Text is normally presented to the viewer in white on a black background, as this is more easily read by viewers with impaired vision. However, when two or more speakers speak and their text appears in the same subtitle, it is necessary to distinguish the text of one from that of the other, otherwise the viewer may be confused over who is speaking. There are several ways of achieving this, of which colouring the text is one.

When a new speaker speaks, the simplest approach to distinguish him or her from the other speakers in that subtitle is to display the text in another colour, providing that that colour is not already present in the subtitle. Typically yellow, cyan and green are used for such alternative colours, with white being used for the majority of the remaining text. However, this simple approach, although frequently used by some broadcasters, is not ideal. Viewers can be confused because, even in the same scene, a speaker can appear each time in a different colour and continuity of the colours is lost.

A better approach is to assign a colour to each speaker at the outset of the programme and ensure that the speaker always appears in that same colour. Other speakers can be assigned that same colour (although this may sometimes not be permitted); however, apart from the colour white, text of the same colour but from different speakers must not appear in the same subtitle. Assigning colours in this way is a much more complex task for the subtitler as they must ensure that speakers do not appear together at any point in the programme before assigning them the same colour. If this is not done then there is the possibility that, should the two speakers subsequently appear together in the same subtitle, all the colours will need to be assigned in a different way and the subtitles completed so far changed to adopt the new colours.

A second aspect of this invention is directed to this problem of efficiently allocating colours to speakers, in a manner such that it can be undertaken automatically.

In implementing subtitling systems along the lines described below, it is desirable to be able to detect scene changes. This is of great assistance in colour allocation in particular. Scene change detection (as opposed to shot change detection) requires complex analysis of the video content and is difficult to achieve.

In accordance with a third aspect of this invention we provide a method of scene change detection which is relatively simple to implement but which nevertheless provides effective scene change detection for the purposes required.

SUMMARY OF THE INVENTION

The invention in its various aspects is defined in the independent claims appended to this description. Advantageous features are set forth in the appendant claims.

A preferred embodiment which incorporates the features of the various aspects of the invention is described in more detail below with reference to the drawings. It should be appreciated, however, that the various aspects of the invention can be used independently or in combinations and ways other than as specially described below.

We have appreciated that, while speech recognition simply does not work adequately, in fact many programmes have a script available at the time the subtitles are prepared. We have therefore appreciated that there is no need for a full speech recogniser to work out what was spoken. What is necessary is to know when the scripted words are spoken. With this information the subtitles can be correctly synchronised to the dialogue. This can in particular be achieved by the use of a technique, known in the speech recognition field, called forced alignment.

The first aspect of this invention is thus directed to this system, by the use of which the time taken to produce subtitles can be dramatically reduced. Some manual editing will still be required, but even so the subtitling time is reduced and the subtitling editor has only to do the interesting part of the job, that is shortening the text in a way which retains the meaning and flavour of the spoken word but which is on the screen for long enough to be read.

The saving in time is such that where no script is available, it may be quicker to type a script so that the invention can be used, rather than proceeding with the conventional method. The script need not be printed but can just be typed as text into a computer file.

In the second aspect of the invention, a system for allocating colours to speakers is proposed, in which groups of speakers are formed, where each 'group' (which may only comprise one speaker) contains speakers who can be represented by the same colour. This typically produces a large plurality of groups. The available colours are then assigned to the groups such that all the speakers are allocated a colour. This is essentially done by ordering the groups, subject to appropriate overall criteria, before performing a search for an optimum colour scheme.

In the third aspect of the invention scene changes in audiovisual material are detected by identifying when speakers are active in the material, and detecting points in time in the dialogue where the group of active speakers changes.

An area of difficulty in working with printed scripts for use in the first aspect of the method is that many different script formats are in use, and it is difficult to automatically interpret the scripts so as to distinguish speech from speaker's name, titles, instructions to the director and actors, timing information, and so on.

In accordance with a fourth aspect of this invention we propose analysing or parsing a script by the use of a statistical method based on Bayes' theorem.

In a fifth aspect of the invention we propose automatically 'placing' the subtitles for two speakers in a picture in dependence upon a determination of their position made by analysis of the left and right stereo audio signals.

In accordance with a sixth aspect of present invention we propose a further improved method which eliminates the requirements for re-typing of the spoken text.

We now propose to generate text in electronic format by playing the audio signal from the audiovisual material; having a person listen to the speech or dialogue and speak it into a microphone; and applying the microphone output signal to a speech recogniser to provide an electronic text signal.

There are then two ways of proceeding. The electronic text signal obtained in this way could be used as the electronic text file. The text information and the audio signal are then aligned in time using time alignment speech recognition to provide timing information for the spoken text. However, this uses two speech recognition operations.

In a preferred method in accordance with this sixth aspect of the present invention, the method therefore includes the following further steps, namely, comparing the timings of the audio signal from the audiovisual material and the microphone output signal; and adjusting the timing of the output of the speech recogniser (which operates on the microphone output) in dependence upon the comparison so as to tend to align the output of the speech recogniser with the audio signal from the audiovisual material.

The text produced by the speech recogniser is already aligned to the spoken text, i.e. the microphone output, and the video of the audiovisual material is already aligned with the audio from the audiovisual material. Thus, by aligning the two audio signals, it follows that the text from the speech recogniser will be aligned with the video and audio from the audiovisual material.

BRIEF DESCRIPTION OF THE DRAWINGS

The invention will now be described in more detail, by way of example, with reference to the drawings, in which:

FIG. 8 is a block diagram of a system which uses speaker identification.

FIG. 9 shows schematically the various branching options available in subtitle generation;

DETAILED DESCRIPTION OF THE PREFERRED EMBODIMENT

Figure 1:
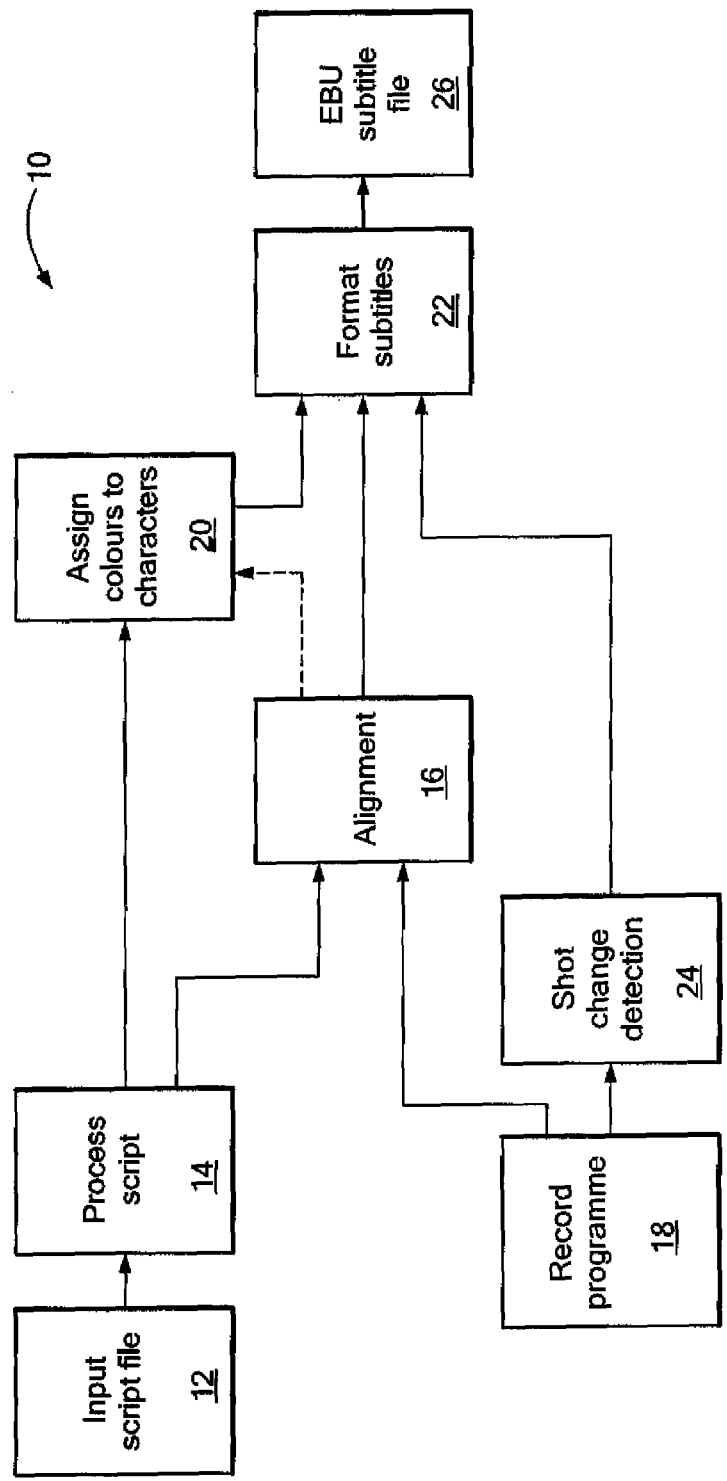
FIG. 1 is a block diagram of an automatic subtitling system embodying the invention in its first aspect.

An automatic subtitle generating system 10 embodying the invention is illustrated in FIG. 1. The figure is in the form of a flow-chart or process diagram, showing the steps that take place in the use of the system. The system may be implemented with appropriate software on a suitable reasonably high specification personal computer.

In outline, the procedure starts with the receipt of an input script file 12. This may be in any one of a number of possible formats of widely used type or specific to the particular user. This script is processed in step 14. The processing involves extracting from the script the spoken dialogue, and preferably also extracting the names of the speakers of that dialogue and the scene details, if these latter two are present. This information is passed to an alignment step 16. In the alignment step, the recording of the programme, recorded on videotape for example, is replayed, step 18, and speech recognition forced or time alignment techniques are used to align the words from the script with the spoken dialogue from the replayed recording. This gives the required timings for each word of the text. The processed script from step 14 is also sent to a separate process, step 20, where colours are assigned for each of the individual speakers. As an alternative, shown in dashed line in FIG. 1, the input to step 20 may be the script as output from the alignment step 16, that is after timing adjustment. Finally the subtitles are formatted in step 22, making use of the timing and text from the alignment step 16 and the colour assignment or allocation from step 20. This is assisted by the output of a shot change detector 24 which receives the replayed video signal from step 18 and generates an indication of whenever a shot change takes place. Shot changes take place relatively frequently and are relatively easy to detect compared with scene changes, which are discussed below. The output takes the form of a subtitle file 26 in accordance with the EBU standard.

For many broadcast programmes a script of the entire programme is normally available. The script will have been written before recording the programme and will have been updated during the production process to reflect any changes introduced.

Hence the task of creating subtitles for a programme is greatly simplified, as the text can be synchronised with the recorded dialogue to give each word its corresponding start and end times in the recording. Once these timings have been derived, the text is formed into subtitles automatically, taking the desired house style into account, so that the resulting subtitles are correctly synchronised to the dialogue.

If a script is not available, then the dialogue can be typed in by the user. Although this detracts from the overall process, it still offers considerable benefits in reducing the time taken in the remaining stages of creating the subtitles.

The operation will now be expanded on and each of the important steps described in greater detail.

Alternative with User Speaking the Words

Figure 5:
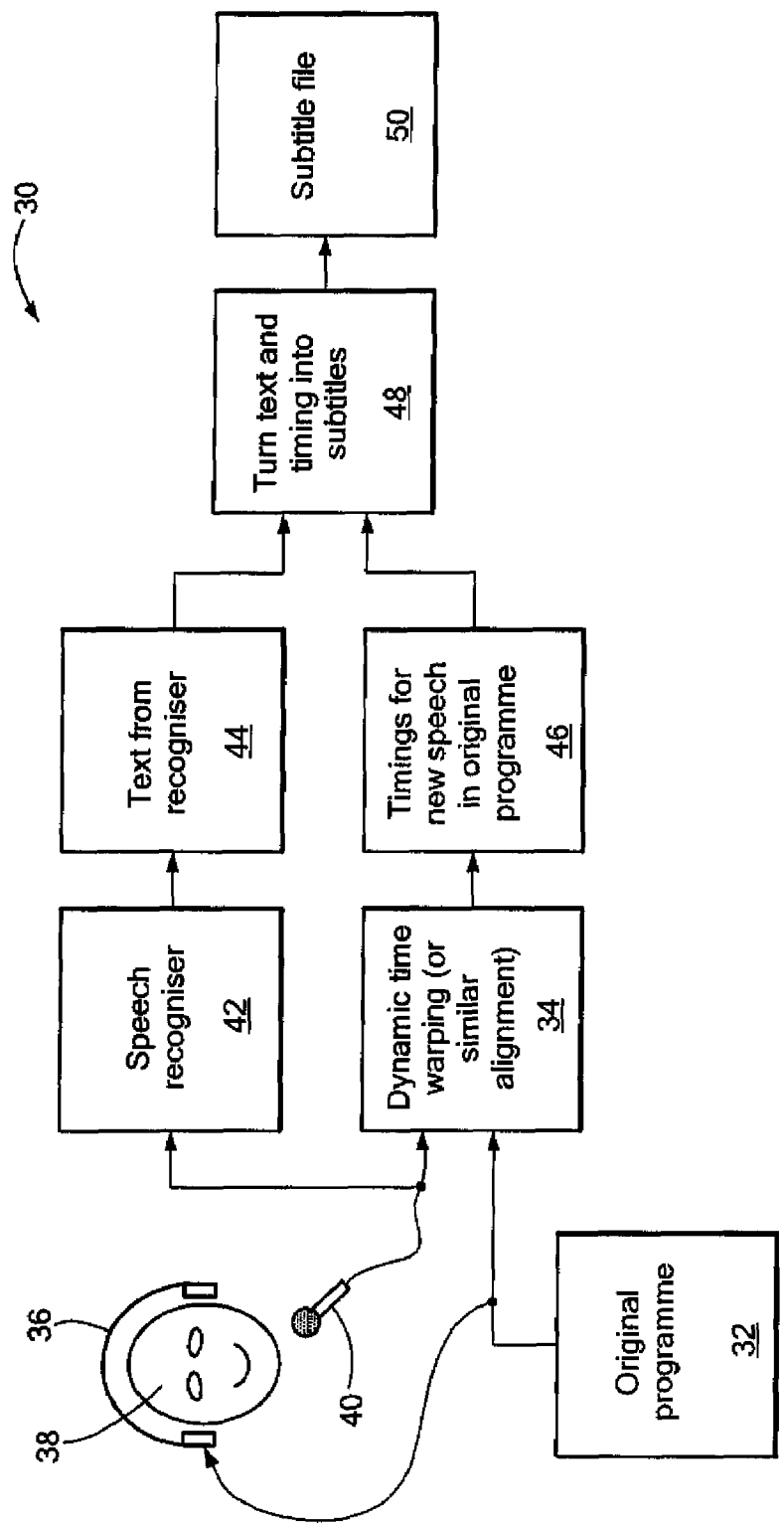
FIG. 5 is a block diagram of an automatic subtitling system in accordance with the preferred method embodying the invention.

An automatic subtitle generating system 30 is illustrated in FIG. 5. FIG. 5 is in the form of a flow-chart or process diagram, showing the steps that take place in the use of the system. The electronic components of the system may be implemented with appropriate software on a suitable reasonably high specification personal computer.

The system 30 comprises the following components. The original programme is replayed as shown in block 32 to produce at least the audio signal from the recorded audiovisual material forming the programme. This audio signal is used in two ways; it is applied to a so-called dynamic time warping block 34, described below, and it is also fed to headphones 36 being worn by a speaker 38. This speaker listens to the audio which they hear in their headphones and repeats it into a microphone 40. In fact, if desired, the speaker can also précis the dialogue by speaking a variation of what they hear, though there must be sufficient words in common with the replayed audio signal.

The output signal from the microphone 40 is applied to a second input of the dynamic time warping block 34 and also to a speech recogniser 42. This may take the form of a commercially-available software speech recogniser such as Dragon's Naturally Speaking or IBM's Via-Voice (trade marks). The speech recogniser generates an electronic text signal indicated by block 44, which is stored in a text file.

The function represented by the dynamic time warping block 34 is to compare the timings of the two audio signals which are input to it, namely the audio signal from the audiovisual material and the microphone output signal. Dynamic time warping is of itself known and is described, for example, in "Digital processing of speech signals" by Rabiner and Schafer, ISBN 0-13-213603-1, see pages 480 to 484. The operation generates timings or timing differences for each word and these are stored in block 46. These timings are then used in a block 48 in the generation of the subtitles from the text from the speech recogniser. The timings are used to adjust the timing of the text in block 44 so that it is aligned with the audio from the original programme.

The system illustrated in FIG. 5 enables the rapid preparation of subtitles even in the absence of a typed text file, with minimum effort and time required.

Script Processing (Step 14)

The script for the programme is received, typically, as a word-processor file, and analysed to find scene boundaries, speaker names and their dialogue, step 14 in FIG. 1. Additional information that can aid the processing includes timing indications, music cues and sound effects, and these will also be extracted from the script. Only the text for the dialogue is required for the process, the other data from the script is optional and, if available, allows the process to produce a better end result in regions where the dialogue may be less distinct.

Although at first sight the script processing appears simple, it is not a trivial task. The layout of the text in a programme script is not restricted and hence many different styles are produced. Furthermore typing errors in the script are commonplace and can result in automatic conversion of the script failing. For example, a missing bracket (closing parenthesis) at the end of a block of studio directions can cause the subsequent dialogue to be lost as it is assumed to be a continuation of the unwanted studio directions.

The analysis or parsing of the script can be carried out by searching for particular patterns of characters, for example upper case characters followed by a colon may always represent a speaker's name, with the mixed case words following being the dialogue, e.g.

LISA: Phil, I can't stay here.

In reality, such rules need to have some flexibility as, for example, a typing error may mean that the colon after the name is not always present. In this case, such an error would result in all of this text being interpreted as dialogue and attributed to the previous speaker.

These two difficulties mean that adopting an approach that uses pattern matching may not offer reliable results: parts of the script that are acting directions for example may be interpreted as names or dialogue if they contain typing errors. If errors such as this occur, then the subtitles produced will clearly contain incorrect text but will also be out of synchronisation with the dialogue around that region.

To overcome these problems we propose the use of a technique based on Bayesian statistics to analyse the format of the script and locate the elements needed. This approach will accept a variety of page layouts in the script and can adapt to new formats. It is also tolerant of typing errors. It is described more fully below.

Alignment (Step 16)

The alignment stage (step 16) takes the speaker and dialogue information, or simplified script, that has been derived from the input script and, with reference to the audio from the programme, calculates timing details for each word spoken. This uses a known technique in speech recognition referred to as 'forced alignment', see for example Gold, B., and Morgan, N., "Speech and Audio signal processing", published by Wiley, 2000, ISBN 0471 35154-7, pages 348–349. Forced alignment, or, more generally, time alignment, is the process of using a speech recogniser to recognise each utterance in the dialogue but with reference to the expected text derived from the script. Hence the speech recogniser is working with a constrained vocabulary and grammar, which makes the task significantly easier than unconstrained recognition where there is no prior knowledge of the dialogue to be expected. The result of such time alignment is a set of timing labels that give the recogniser's best alignment for each word of the given text.

Colour Assignment (Step 20)

The colour assignment stage in the process (step 20) assigns colours to the speakers. When an entire script for a programme is available, in accordance with an aspect of this invention this can be analysed automatically to determine which speakers appear in the same scenes and which might appear together in the same subtitle. From this analysis, an optimum assignment of colours to speakers can be made. This saves a great deal of time.

This step optimises the allocation of the limited number of text colours that are available for subtitling to the different characters in the programme.

Coloured subtitle text is used to distinguish one speaker from another when their text appears together in the same subtitle. However, the restrictions on using colours (typically, only three colours and white are available) mean that optimal usage of the colours is difficult to ascertain without repeated viewing of the programme and some trial and error.

The proposed search technique, described in more detail below, performs this assignment of colours automatically by analysing the script to determine which characters interact throughout the programme. From this, the search can assign colours such that two characters who are given the same colour do not appear together, and each character always appears in their same colour. It will also take into account any colour assignments that the user has chosen to impose (such as the narrator may always be in yellow text) and work around these additional constraints.

Shot Change Detection (Step 24)

The shot change detection stage in the process (step 24) takes the recording of the programme and applies shot change detection to the video. This produces a list of frames in the video where there is a change of shot, for example, switching to a different camera or viewpoint, or a change of scene.

Shot changes are helpful in subtitling because, if ignored, they can result in the subtitles being more confusing for the viewer to follow. If a subtitle is present when a shot change occurs in the video, there is a tendency for the viewer to look away from the text to the new image and then back to the text. By this point, they have lost their place in the text and re-read it from the beginning, which can leave insufficient time to read the entire subtitle before it ends. This can be avoided by ensuring that subtitles are either not present, or change, when the shot change itself occurs.

A further refinement to improve presentation, is that subtitles should not start or end near to a shot change, typically in a region 25 frames on either side. In this case, the subtitle in-time or out-time is changed to match the shot change. In this way there is less confusion for the viewer as the two change together.

A known shot change detection method can be used, for example one based on the mean average difference technique. See Ardebilian, A., et al., "Improvement of shot change detection methods based on dynamic threshold selection", Proc. SPIE Multimedia storage and archiving systems II, Dallas USA, 3–4 Nov. 1997, pages 14–22.

Generation of Subtitles (Step 22)

The final key stage in the process is the generation of subtitles (step 22). This uses the text for the dialogue together with the timing information for each word, the shot change details for the video, the colour assignments and, by applying various subtitle formatting rules, generates the subtitles. These are typically written to a file in the standard European Broadcasting Union (EBU) file format described in the EBU document Tech. 3264.

The subtitles produced by this method may require some further revision and correction by a subtitle editor to tidy difficult sections of the text or précis the text where it would produce a long subtitle that cannot be read in the time available on-screen. Nevertheless the overall saving in production time is very significant.

This stage 22 takes the data from steps 16, 24 and 20 (text and timings, shot changes and colours) and produces subtitles subject to various constraints and guidelines on house style. This again is not a trivial task as finding the optimal format for a subtitle can be extremely difficult to automate, particularly when it will be influenced by many conflicting factors.

The generation of the subtitles requires the combination of the text, timing, colouring and shot change data to produce appropriately formatted subtitles. This process requires the analysis of the various data sources and then various optimisations must be performed to achieve the best overall appearance of the subtitles. The basic steps in this process may for example be:

i) Add words, one-by-one, to form the subtitle, starting a new line as each one is filled.

ii) Colour the text as required for the speaker. If necessary, insert dashes or other markers into the text to identify different speakers using the same colour in the same subtitle.

iii) End the current subtitle optionally and start a new subtitle when there is a pause in the dialogue.

iv) When words are spoken as a shot-change occurs, end the current subtitle and optimise the grouping of words between the current subtitle and the next subtitle to minimise any interruption to the flow of reading. This must take into account the timing of the words, phrases and sentences, etc., the structure of the text, and when changes of speaker or scene occur.

v) Where possible, increase the duration of short subtitles (typically those less than one second in duration) to an acceptable minimum duration.

vi) Where possible, balance the text between the lines within each subtitle to achieve an even appearance on-screen.

vii) Start a new subtitle either when the current one has been filled or when other features dictate this is necessary, e.g. a new scene starting. Such splits between subtitles should be optimised as in (iv) above.

This implementation of this stage applies various formatting rules as it creates each subtitle but optimises the appearance of only the current subtitle it is working on. Although some rules are included to ensure that the subsequent subtitle should appear reasonable, its appearance is not optimised until the processing advances to that point. This can lead to the situation where well-formed subtitles can be followed by ones that are less acceptable. We therefore wish to optimise the appearance over all the subtitles.

In a nutshell, the approach is to create all possible subtitles from the given text and then choose the best sequence of subtitles based on guidelines to do with appearance, etc. However, in practice, the problem is that a simple search is this way soon becomes excessively time-consuming. For example, working with just 16 words, the search will take about four minutes on a PC and this time increases by a factor of three for each additional word. This naive approach is therefore impractical for a typical programme script which will contain 3500 words for a half-hour programme. The key is to use techniques that limit the search carried out and the implementation developed takes about three seconds to find the optimum sequence of subtitles for an entire half-hour programme. An additional benefit is that, by changing the scoring for the various attributes of the subtitles that we assess, we can easily make the software produce subtitles of a quite different appearance. Hence we also achieve the flexibility that is attractive in a product.

The essence of the approach is to create subtitles from text using the following steps:

a) for each word in the script consider the options of adding it to the current line of the subtitle, starting a new line of text in the current subtitle or starting a new subtitle.

b) for each of these options, calculate a score for the subtitle being produced based on a number of attributes, e.g. number of lines in the subtitle, line length, position of the final word in its sentence, etc., (we use over 50 such attributes.)

c) continue to add each word in turn and re-calculate the subtitle scores d) find the best sequence of subtitles that together maximise the overall score through the programme.

Step (c) is the where the algorithm is crucial in order to keep the search time to a minimum; here we are using a search technique similar to a well-known algorithm but modified for this application.

How many different sets of subtitles is it possible to make for a programme? If we consider that between each word and the next within a programme there can either be a continuation to the next word on the same line, a new line within the subtitle or a new subtitle, we reach the number: $3^n$ Continuations For a 4000-word programme this is $3 \times 10^{1908}$. Of course the actual number of possible subtitles is smaller as there is a limit on the number of words on a line and to the number of words in a subtitle, but there is nonetheless a huge number. A brute force implementation of a system to simply produce all possible subtitles (without scoring) takes about a minute (Pentium II 750 MHz) to tune to 15 words or 4 minutes to run to 16 words with each additional word taking 3 times longer than the last. This is clearly not acceptably fast. Luckily searching trees is a repetitive and predictable task and we can make use of fast search techniques.

It is easy to draw a tree of the possible subtitles for the first two words of a programme as shown in FIG. 9.

If we consider that a similar tree can be drawn originating at each of the occurrences of the second word then it can be seen that the tree is uniform. Huge sections of the tree will represent useless subtitles; ones that either have too many lines or lines that are too long to display. Furthermore each legal route through the tree differs from the next at only one word boundary so there is some obvious potential for pruning.

Our technique uses a system similar to Dijkstra's Shortest Path Algorithm as described in X. To explain it, we can start by forgetting trees and instead considering the same information represented in a simple 2-dimensional state machine to find the best path through a programme.

Figure 10:
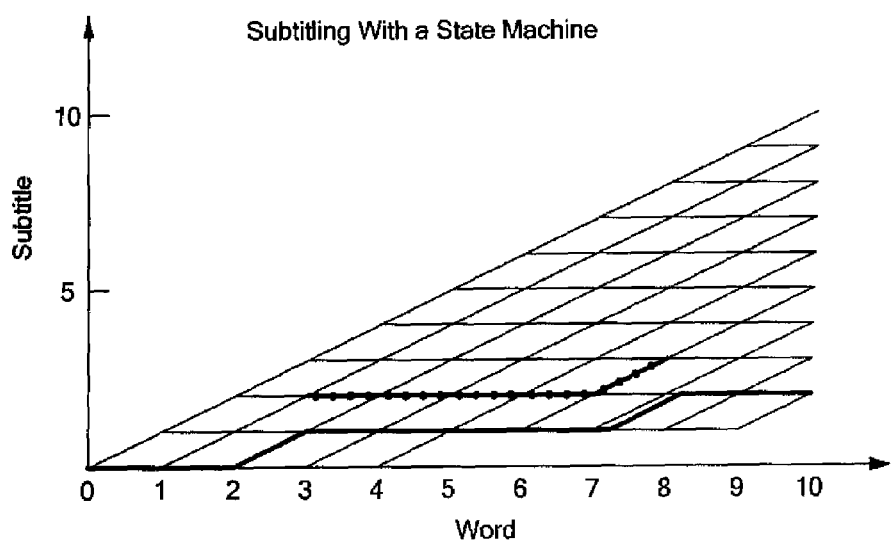
FIG. 10 shows a graph of word number against subtitle number illustrating how different subtitles may be connected.

In this explanation we will not consider line breaks, only subtitle breaks. FIG. 10 shows a graph of word number against subtitle number. This can be considered to be a state machine as words are analogous to duration and each subtitle is analogous to a state. All of the possible routes through the graph are shown. One example route is highlighted in grey (Words 0,1 and 2 in subtitle 0, words 3, 4, 5, 6 and 7 in subtitle 1 and 8, 9 and 10 in subtitle 2).

There is a limit to the number of words that is possible to have in a subtitle. To simplify this explanation it has been set at 5. On the graph, this can be seen through the absence of a route along the x-axis past word 4. This is because such a route would represent having more than five words in subtitle 0, exceeding the limit. The limit also prevents a subtitle 1 from running beyond word 9, this is again visible on the graph, there are still some illegal routes possible on the graph that cannot be removed without also removing legal routes e.g., word 2 to word 10 in subtitle 2.

With all of this in mind, there are two things that we need to be able to do:

Carry out the comparison of all these routes in an adequate time.

Find out which of these routes (sets of subtitles) is best.

To do the first a system of penalties is introduced. Each route will incur a score (or penalty) so that the best scoring route can be chosen. The scoring system is pessimistic with a higher penalty (score) indicating a less optimal subtitle. A fixed penalty can be introduced at each location in the graph for continuing and another penalty at each point for splitting to a new subtitle. We then look for the route with the lowest overall penalty.

To produce well formatted subtitles we may, for example, have a high penalty for splitting anywhere but at the end of a sentence and a high penalty for continuing from a word in one scene to one in the next. The advantage of having penalties associated with splitting and continuing at each word is that they only need to be calculated once rather then for every route that they form part of. This is especially useful when time consuming tasks like grammatical analysis are performed.

Scoring still needs to be performed on a per subtitle basis in order to judge things like subtitle shape, which cannot be worked out in pre-processing; this is done as the searching algorithm runs.

Finally, it can be seen that, ignoring the previously accumulated penalty, the penalty incurred by a subtitle that runs from word 3 to word 7 without splitting will always be the same. The dotted line on the graph incurs the same penalty as the subtitle below it as they are mathematically identical. This particular subtitle appears once more in the graph, above the dotted line.

To compare all of the routes we start at the beginning of the programme and progress word by word.

At word 0:

We calculate the penalty for a subtitle consisting of word 0 on its own:

(Word0)

This penalty is the only possible penalty for a set of subtitles running from word 0 to word 0. It is implicitly the best. We retain the best penalty for future use, so this penalty is retained.

At word 1:

First we try (Word0 Word1)

Then we try the best route to Word 0 (which we've stored) followed by 1:

[Best route to Word 0] (Word1)

Word 0 is in square brackets because we don't care what comes before word 1, we simply chose the best route up to the end of word 0. (In this case there is no difference as there's only one possible route)

The best of the above two subtitles is picked and stored.

At word 2:

First we try all possible routes from word 0 without splitting:

(Word0 Word1 Word2)

Now we try all possible routes which split between words 0 and 1

[Best route to Word 0] (Word1 Word2)

And then all possible routes which split between words 1 and 2

[Best route to Word 1] (Word2)

From these we can store the best as the best possible route to word 2. This process continues on through the programme. Assuming we have a maximum subtitle length of 5 words, the situation at word 10 will be as follows:

The subtitle (Word0 Word1 . . . Word10) is not considered because it is illegal, as is the route represented by [Best route to Word 0] (Word1 . . . Word10). The starting point has to be at word 6 (as '6, 10" is 5 words). So we choose one of the following options:

[Best rout to Word 5] (Word6 Word7 Word8 Word 9 Word10)

[Best rout to Word 6] (Word7 Word8 Word 9 Word10)

[Best rout to Word 7] (Word8 W Word 9 Word10)

[Best rout to Word 8] (Word 9 Word10)

[Best rout to Word 9] (Word10)

The best of these choices will give us the optimal set of subtitles for the whole programme within the defined rules (in this case a maximum of 5 words, no new lines). By keeping the best penalties at each stage of the search the search space is restricted to cover only routes which have the mathematical potential of being in the optimal path. This is a tiny fraction of the overall search space.

The preferred algorithm differs in two ways from the illustration above, firstly there is no fixed limit to the number of words on each line, it is altered dynamically to match the teletext 40-character limit on the section of programme being looked at. Secondly new lines are also considered by splitting each subtitle in 0.1 and 2 places (for 3 line subtitles) and picking the best. As a worked example considering this in our simplified model:

[Best route to Word 6] (Word7 Word8 Word 9)

Would mean considering all of the following:

No new Lines:

[Best route to Word 6] (Word7 Word8 Word 9)

One new Line:

[Best route to Word 6] (Word7 [new line] Word8 Word 9)

[Best route to Word 6] (Word7 Word8 [new line] Word 9)

Two new lines

[Best route to Word 6] (Word7 [new line] Word8 [new line] Word 9)

While this results in considerably more combinations than the one line model, it still shrinks the search space for a 4000 word programme from $3 \times 10^{1908}$ to $2.6 \times 10^6$ comparisons.

Figure 11:
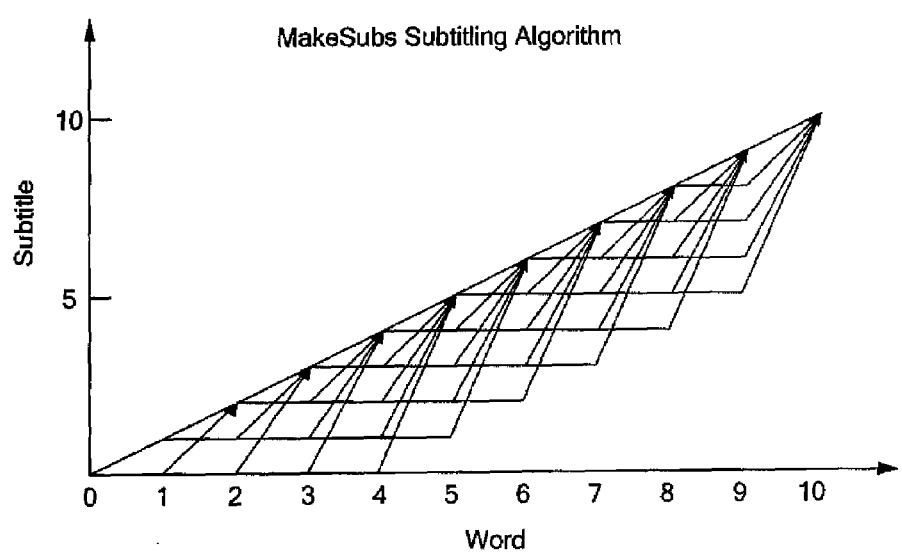
FIG. 11 shows a modification of the graph of FIG. 10 in a preferred embodiment.

This subtitling algorithm reduces the history from a given word in the programme, back to the start, to a single routee. This can be shown in a diagram similar to a state machine in FIG. 11. The difference here is that all of the routees to a subtitle starting at word n are shown to converge (because only one of them will be stored). A significant difference between this diagram and the state machine of FIG. 10 is that the gradient of the bottom of the graph is the same as that at the top. This shows that the search space expands in a linear fashion as words are added.

At each word there is a penalty for continuing to the next word, a penalty for splitting to a new subtitle. These penalties are worked out before the search is performed and are outlined in the pre-processed scoring section below. Some additional scoring takes place at run time; this is detailed in the runtime scoring section below. All penalties are additive and cumulative. The system loads its scoring parameters from a profile. Details of this are also given below.

Pre-processed Scoring

Each subtitle's continue, new line and new subtitle penalty is calculated in pre-processing. These penalties are based on e.g. the following factors:

The position of a word within a sentence.

The position of that sentence within a larger block of text from a single speaker.

The scene which the word is in.

What colour the word is.

How close the word is to others before and after it.

Figure 12:
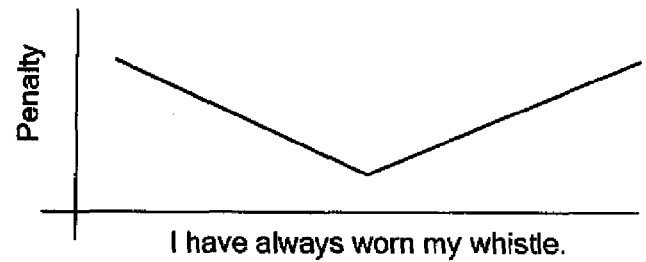
FIG. 12 shows graphically how the score assigned to a split point in a sentence changes through a sentence.

The line and subtitle scoring parameters for scoring sentences can be set independently but they follow the same scoring model. A maximum value (a) and a gradient (m) are set. The penalty for splitting at any point in the sentence is given by a-ml where l is the distance from the nearest end of the sentence in letters. This is shown in FIG. 12.

Figure 13:
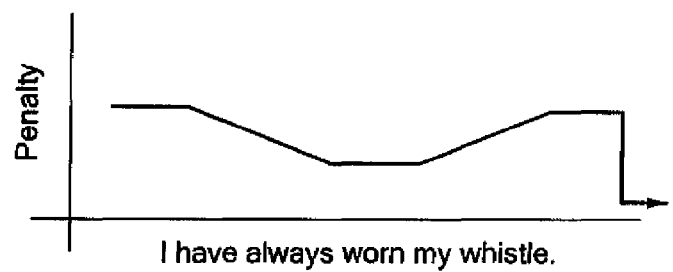
FIG. 13 shows a modified version of FIG. 12 with high and low copping levels.

In addition to this, the penalty can be fixed between a high and a low capping level. This is shown in FIG. 13. Note that the maximum in the second diagram is set above the capping legal to create an area of equal penalty at the top left and top right ends of the graph.

The penalty for splitting after the last word in a sentence is a special case. Some subtitlers consider a full stop to be a good place to split to a new line while other prefer to split to a new subtitle. To accommodate the former the penalty for splitting to a new line at the end of a sentence should be low, whereas for the latter it should be high and the penalty for splitting to a new subtitle low.

The less fragmented text is, the easier it is to read so it's best to continue to the next word in a sentence on the same line if possible. If a sentence won't fit on a single line then it is easier to read it divided over a few lines (in one subtitle) than it is to read the same sentence divided into a few subtitles. It follows then, that to make subtitles easy to read, the penalties for splitting to a new subtitle should be higher than for splitting onto a new line.

All penalties are relative so the actual numbers have no significance. As a rule of thumb, new subtitle penalties should be 2 to 5 times the new line penalty for the same location. The continuation penalty can be set for the end of a sentence or speaker. This is usually left at 0 unless the subtitler wants to split to a new subtitle at the end of each sentence/speaker.

Penalties for splitting within a speaker follow the same model as splitting within sentences. If the minimum penalty is set to a relatively high level but the gradients are less steep than that for sentences then the lowest penalty should be obtained by trying to keep as much of a speaker's dialogue as possible in a single subtitle. If this is not possible, then splitting at the end of a sentence should get the lowest penalty. Splitting in the middle of a sentence is only likely when a sentence is too long to fit into one subtitle.

Scene Changes and Gaps

Figure 14:
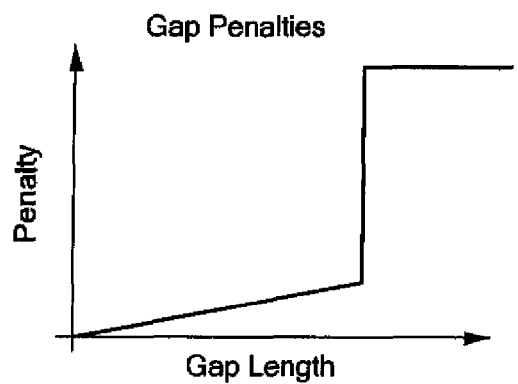
FIG. 14 shows graphically the preferred format for a gap penalty.

All of the above attract a line and subtitle penalty to discourage subtitles from including them. For gaps (pauses in dialogue) it is possible to have the continuation penalty proportionate to the gap size up to a certain threshold level where the penalty becomes much higher, as illustrated in FIG. 14. This is implemented because a short pause by a speaker often indicates a good place to split to a new subtitle when no other clue is available and a whole sentence cannot fit into one subtitle. Having a higher continuation penalty encourages splitting.

Subtitles should not continue through a long gap in speech (this is confusing and obscures the screen unnecessarily when something is being said), so both line and continuation penalties should be high for long gaps.

Runtime Scoring

Runtime scoring looks after subtitle shape and reading times. It also performs some legality checks as this is neater than messing up the engine with them.

There is a penalty associated with the number of lines in a subtitle. It is possible to set the penalty for each of 1, 2 and 3 lines completely independently. This can be used, for example, to set a bias against 2 line subtitles in favour of 1 and 3 line subtitles or against 3 line subtitles in general.

For two subtitles, the difference in length between the top and bottom line is counted. A penalty is added per letter of difference. The penalty per letter for the top line being shorter than the bottom line and vice versa are independently defined so that a preference for subtitles like this:

(Formatting subtitles isn't as easy as it looks)
Can be expressed over subtitles like this:
(Formatting subtitles isn't as easy as it looks)

Studies suggest that the first of these examples is easier to read, as your eye doesn't have to move as far. It also uses up most space at the bottom of the television picture, where it is less likely to obscure something important.

For three-line subtitles a mean of the line length is calculated and then the penalty is proportional to the sum of differences between each line's length and the mean. A penalty is also added for subtitles that are concave:

(Formatting subtitles isn't as easy as it looks)

This only applies to subtitles where the middle line is at least 8 characters shorter than the lines above and below it. At present there is no scoring based on the shape of one-line subtitles.

A simple penalty for each empty letter on a line in a subtitle exists. Setting this promotes wide subtitles.

The read time of the subtitle is also considered in runtime scoring. A fixed amount of time is subtracted from the duration of the subtitle (a time penalty is set for each of one, two and three line subtitles) then the number of words is divided by the duration (in minutes) of the subtitle to calculate a reading rate in wpm. This reading rate is compared to a target reading rate and a penalty is then applied. The shortening of the subtitle duration, according to how many lines the subtitle has, is to take into account the fact that it takes longer to read the same words spread over multiple lines or subtitles than it does to read them in one line. The time penalty for a one-line subtitle is simply the general time taken to focus on a new subtitle and for two and three lines the extra time taken to read over several lines is added to this.

Generation of Subtitles: Placement of Text

In addition to using coloured text another way which can be used to assist in distinguishing one speaker from another is to place the text for each speaker in a position on the screen that corresponds to his or her position in the picture. Hence, if two speakers are talking together, the speaker to the left can have subtitle text appearing left justified, whilst the speaker to the right has text which is right-justified. This technique is frequently termed 'placing'. This 'placing' of subtitles can be achieved automatically by measuring the relative levels of the speech signals in the left and right channels of a stereo recording. This measurement can be used to determine which of the speakers is nearer the left of the picture and which is nearer the right, and this is then used to affect the justification of the text for each speaker so that their text matches their position in the picture.

Generation of Subtitles—Placement Using Stereo Audio Signals

Figure 6:
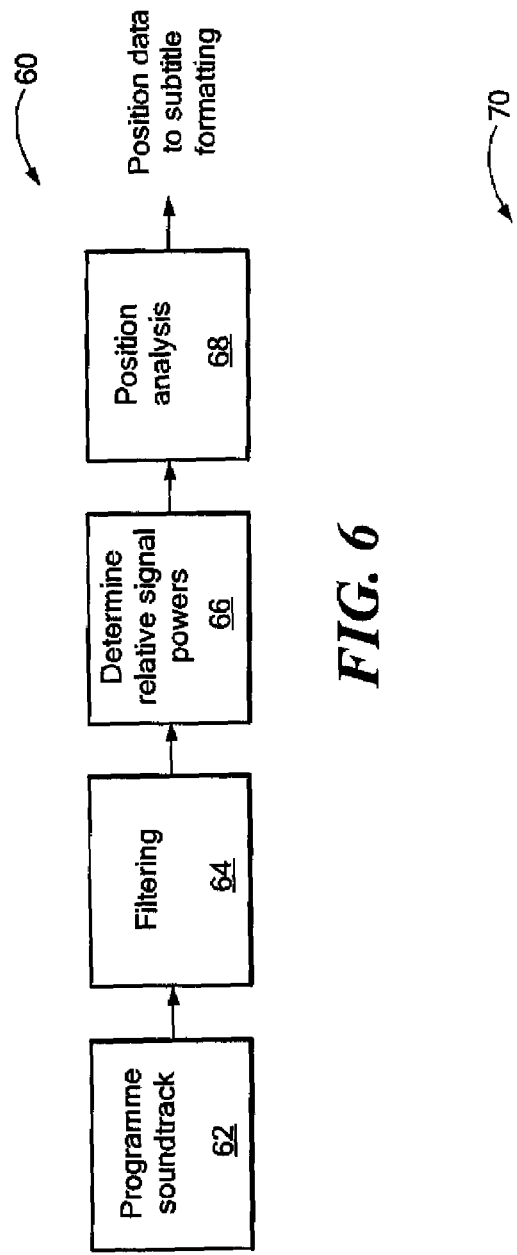
FIG. 6 is a block diagram showing more detail of a system for placing the subtitles in dependence upon the audio signal.

The system 60 shown in FIG. 6 starts with the programme soundtrack 62. This is applied to a band-pass filter 64 which typically passes the frequencies 700 Hz to 5 kHz. These frequencies are passed to a circuit 66, which determines the relative powers of the left and right components of the stereo signal. The detailed construction of such a circuit is well within the competence of those skilled in the art and the precise construction will generally depend on the equipment in which it is to be used. The relative power measurement can be relatively coarse as all that is required in a simple embodiment is to determine whether the left and right signals are roughly equal, and if not, which is the greater of the two.

This relative power measurement is then applied to a position analysis circuit 68 which converts the relative power measurement into a subtitle position signal. Typically, this has three values, namely "left", "centre", and "right". This position signal is used by the subtitle-formatter 22 (see FIG. 1 of our earlier application).

If a more sophisticated method of measuring relative power is used, the subtitle position signal can be arranged to represent intermediate positions and not just left, centre and right.

An alternative and more complex method of deriving the necessary position information is to use the techniques described in a paper "Ambisonic Decoders for HDTV" by M. Gerzon and G. Barton, Audio Engineering Society preprint number 3345, March 1992.

Generation of Subtitles—Placement Using Picture Information, in Particular Faces Instead of, or in addition to, analysing the stereo audio signal to provide information for placing the subtitles, it is possible in accordance with a feature of this invention to analyse the picture to determine useful information, and in particular to analyse the picture to determine the placement of faces and/or to detect lip movement.

Figure 7:
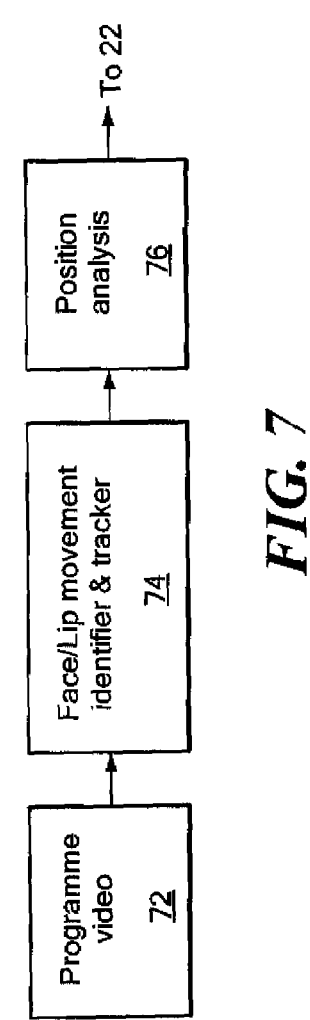
FIG. 7 is a block diagram of a system which uses picture content, in particular information on faces, for placing the subtitles.

FIG. 7 is a schematic block diagram illustrating the apparatus 70 necessary to incorporate such a feature. In this instance the programme video is taken in a circuit 72 and applied to an image analyser 74 which is designed to identify and track the faces of the speakers. The circuit 74 may, for example, be based on that described in the paper "Face tracking and realistic animations for telecommunicant clones" by S. Valente and J. L. Dugelay, "Multimedia", pub. by IEEE, January–March 2000. The circuit 72 uses the techniques there described to identify faces from among the picture information and to provide an output accordingly which indicates the location of the face in the picture. This is applied to a positional analysis circuit 74 which corresponds to the position analysis circuit 68 of FIG. 6, and the output of which is applied to the subtitle formatter 22.

While the use of the tracking of faces and/or lip movement has been described, other items may be tracked such as a human silhouette or items of clothing or jewellery, for example.

Subtitle Re-versioning

Another application for the system described is termed 're-versioning' of subtitles. In this case subtitles will have already been prepared by the programme producer or original broadcaster. However, when the programme is broadcast on a different channel, typically by another broadcaster and in a different country, the original subtitles may not be entirely appropriate. As well as not matching the preferred style of the second broadcaster, they may no longer be correctly synchronised to the programme because of timing differences introduced by the conversions that occur from film and video tape between the differing television standards. When this occurs, each subtitle must be re-synchronised to its dialogue, a process that is again very time-consuming.

A system embodying the present invention can solve this problem very effectively but, in this case, the original subtitles are used instead of the script to provide the text of the speech. The original subtitles may have been prepared by the above-described method. Once the alignment phase has been completed, the user has the option of either using the new timings to produce replacement in-times and out-times for the original subtitles, or generating completely new subtitles from the text of the original subtitles (i.e. as though they had been the script). In this latter case, speaker details would not be available but speaker identification applied to the audio recording could be used to identify when different speakers start to speak. Where speaker identification technology permits, it could additionally identify how many speakers there are in the programme and hence allow automatic re-colouring of the speakers as though the text had been derived from a script.

As this re-versioning process is carried out, it is also a relatively simple step to perform certain word, phrase and formatting conversions to change the presentation of the subtitles into that preferred by the broadcaster.

Subtitle Re-versioning—Uses of Speaker Identification

FIG. 8 illustrates a system 80 for implementing this. The system receives a script 82 which may be the existing subtitles in a re-versioning operation, but more generally, may be a text signal representing the programme script. The system also receives the programme soundtrack 84. The expected speech dialogue is extracted from the existing subtitle text 82, and the speech recogniser, shown in FIG. 8 by the reference 86, corresponding to block 16 in FIG. 1, undertakes timing alignment and produces timings for each word, as described in relation to FIG. 1 in our earlier application.

A circuit 88 receives the programme soundtrack 84 and the output of the timing alignment stage 86 and determines previously-specified characteristics or parameters for the speaker's voice, so as to identify who the speaker is. That is, the circuit 88 performs a word-by-word analysis on the programme soundtrack to determine when key parameters of the speech change. This may be taken to indicate a change of speaker.

The analysis undertaken by the circuit 88 can be improved in reliability by making use of punctuation from the subtitle text, so as to cluster together words into longer sequences or phrases that are most likely to be spoken by the same speaker. Reference is made to "Digital processing of speech signals", by Rabiner and Schafer, ISBN 0-13-213603-1, pages 485 to 489 in relation to speaker identification techniques and appropriate speech parameters.

When a change of speaker is identified, the circuit 88 provides the new speaker's voice parameters to a circuit 90. The circuit 90 stores the voice parameters for each of the speakers so far identified in the programme, and compares the parameters for the new speaker with the stored parameters. In this way the circuit 90 determines whether the new speaker's parameters are substantially the same as the stored parameters for one of the previous speakers, and if so assumes that the 'new' speaker is, in fact, that previous speaker again. If a significantly different voice is detected, then this is interpreted as a new speaker. The new speaker's parameters are now themselves stored, to update the details of the speakers, in a stage 92. Thus, the system counts the number of speakers in the programme.

Occasional speaker identification errors may occur but in practice the system operator will generally work through the subtitles as the analysis proceeds and so can correct any speaker identification errors as they occur. If this is done the stored parameters for the previous speakers are reliable, and hence identification of subsequent speakers becomes more reliable as the operation continues.

Once the whole programme has been analysed in this way, colouring analysis can be carried out, based on the details of speaker interactions throughout the programme. To this end the system 80 provides an output 94 which is used in the colouring algorithm as described in our earlier application.

Précising the Text

In any programme there will be regions where there is too much dialogue spoken to for the viewer to be able to read the subtitle in the time available. The number of words used to subtitle such regions is normally reduced to keep the reading speed below certain limits. This is carried out by abbreviating some words, e.g. £10 million becomes £10 M, and précising phrases where possible. Of these two methods, the first is relatively straightforward to implement but the second requires an additional processing element to be added to FIG. 1. When necessary, as the subtitles are being formed, this additional module performs language analysis to find words which can be deleted or where phrases can be simplified. This then reduces the text to an acceptable number of words and the subtitles formed from this revised text. The software package "Eliser" developed by the University of East Anglia illustrates one method of accomplishing this function See for example Wells, M., et al., "Simon— An innovative approach to deaf signing on television", Proc.

International Broadcasting Convention, 1999 pages 477–482. For a description of the grammatical analysis techniques that can be used within this procedure, see Daniel Sleator and Doug Temperley, "Parsing English text with a link grammar", Third International Workshop on Parsing Technologies, August 1993.

Live Subtitling

In a live-subtitling situation, such as a news programme, there can be sections where the text is scripted beforehand, e.g. the news presenter's introduction to each story. For these parts, the text can be turned into subtitles before it is spoken as these can be held ready for transmission and then output as the presenter reaches the corresponding point in the scripted text. Currently this is done by hand.

Some elements of the present invention could also be used to automate this process. The text can be formed into subtitles automatically, although shot changes and timing details would not be available at that point. The forced alignment technique can be used to track through the script as the words are spoken in the broadcast and as the first word of each pre-prepared subtitle is spoken, that subtitle can start to be transmitted.

Detail of Script Processing Using Bayes' Theorem

We propose a script-processing procedure that can decode script files, using a statistical description of the script format. These descriptions are contained in probabilities files. They can be written for specific programmes or for more general script formats.

The system thus analyses scripts in a statistical way. The script is first broken down into blocks, to separate text in different styles and at different positions on the page. Then, for each block, probabilities are evaluated for a number of hypotheses as to the type of script component which that block is, such as 'the text is a speaker name' or 'the text is dialogue'; by testing a number of 'properties' that are specified in a probabilities (.prob) file. From these, using likelihood values also listed in the .prob file, probabilities for the hypotheses can be inferred by means of Bayes' theorem.

Many different properties can be used to help decode a script. Examples include the following:
  Approximate horizontal position of the text.
  Bold, italic and underline.
  Upper, lower or 'mixed' case.
  Character set.
  The character immediately following the block.
  The character immediately preceding the block.
  The last non-space character of the block.
  The paragraph style name.
  Left, right, centre or full justification.
  The presence of any keyword from a supplied list.
  All words being taken from a specified vocabulary (i.e. no word not being present in a supplied list).
  The number of words in the block.
  The block being the first or last on a line.
  The document section number.
  The column number in a table.
  The line spacing for the block.
  The number of occurrences of a particular character.
  The context of the block may also be tested:
  The chosen hypothesis for the previous block when on the same line.
  The chosen hypothesis for the previous block when on the previous line.
  The chosen hypothesis for the previous block.
  The chosen hypothesis for a block directly above the current block.
  The block being in the most likely column for a particular type of text.

Finally, there are properties that test attributes in other blocks and ones that combine properties:
  Any property, tested on the next text block.
  Any property, tested on the previous text block.
  Any property, tested on the whole line containing the current block.
  Any property, tested on the first character of the current block.
  Any property, tested on the first word of the current block.
  Both of two properties being true.
  Either of two properties being true.

To differentiate between independent and non-independent properties, the various properties listed in the .prob file are grouped. Each group is considered to be independent of the others but will contain non-independent properties. Foe each property within a given group, the .prob file specifies the likelihood that the property is true and that those before it in the group are false. Thus the likelihoods relate to mutually-exclusive events within the group.

Since the groups are independent, the a posteriori probabilities for each hypothesis can be calculated using Bayes' theorem, as follows:

$$P(H_i | D) = \frac{P(H_i) \cdot \prod_g L(D_g | H_i)}{P(D)}$$

where
  $P(H_i)$ is the a priori probability for hypothesis Hi.
  $L(D_g | H_i)$ is the likelihood of the observed properties for group g under hypothesis Hi.
  $P(D)$ is a normalisation constant that can be calculated from the sum of the numerators of all the hypotheses, i.e.:

$$\sum_i \left[ P(H_i) \cdot \prod_g L(D_g | H_i) \right]$$

As noted previously, the approach based on Bayesian statistics can adapt to new formats. Adaptation enables the script processing software to cope with a variety of script formats without having a statistical description of each one individually. The software processes the script initially according to the likelihood values listed in the .prob file. Then, for properties marked for adaptation in the .prob file, new statistics are estimated from the results of the initial analysis, using Bayes' theorem once again. This step reduces the mis-classification of blocks of text in the script.

Using this technique, a generic statistical description covering a variety of script formats can be prepared. For example, on a first pass, the analysis might mis-classify a small proportion of speaker names, perhaps due to typing errors or inconsistencies in the script. However, if the majority of the text has been classified correctly, the re-estimation process will pick up other properties that distinguish the different text types, leading to a more accurate classification on the second pass.

Detail on Assigning Colours to Characters

Typically, a number of rules are applied when choosing colours for subtitles, such as:

Each speaker must keep the same colour throughout the programme.

Colours other than white can only be assigned once per scene.

The last speaker of one scene should not use the same non-white colour as the first speaker in the next.

Within these constraints, a good colouring scheme is one that has few interactions between pairs of white-coloured speakers. Such interactions require other, less satisfactory methods to indicate changes of speaker. Since coloured text, especially in green, is more difficult to read than white, subtitle editors also try to minimise the amount of colour used.

Ideally, therefore, as many as possible of the interactions should be between a 'coloured speaker' and a 'white speaker'.

We propose a system to find a scheme meeting these constraints. The algorithm begins by generating a list of possible 'groupings' of speakers. That is, groupings are combinations of speakers that could share a colour under the rules listed above, namely, speakers that never appear together. A typical drama programme can have around 1,000 possibilities. The complete list is generated by successively combining groupings, beginning with a list of the individual speakers. The algorithm considers each of these initial groupings in turn, starting with the last. It then searches down the list from the grouping under consideration to the end, creating new groupings for each valid combination.

Figure 2:
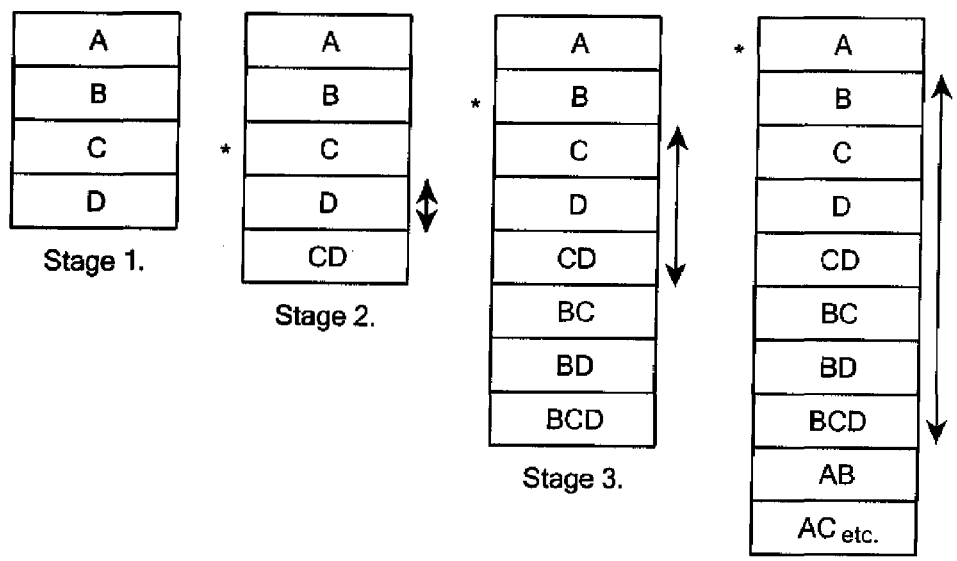
FIG. 2 illustrates a method of allocating colours to speakers in accordance with an aspect of this invention.

FIG. 2 illustrates the generation of the groupings list for four speakers, assuming the unlikely situation that all possible combinations are valid, i.e. the four speakers only appear separately. A colouring scheme for the programme can be found by selecting one grouping for each colour available. The groupings chosen must have mutually exclusive sets of speakers. Sometimes, it may not be possible or even desirable to use all the available colours, especially if more than four are available. The algorithm therefore includes an empty 'null' grouping in the list of possibilities (there may be more than one).

In FIG. 2, in stage 1 shown at the left of the Figure, from an initial list the last group is selected or marked. The term 'group' here covers just a single speaker. A search is then conducted downwards from the marked group for possible combinations. In stage 2, the previous marked group, in this case 'C', is considered. The search now finds that 'D' can be combined. A new group 'CD' is created. In stage 3 the procedure is repeated and three more groups are found, namely 'BC', 'BD', and 'BCD'. Stage four shows that further groups containing 'A' are also found. The double-headed arrow on the figure shows the region to search at each stage.

Each of the available colours is then allocated to one of the groups. In most cases, no set of four groupings will completely cover all the speakers. In this case, the leftover ones must share 'white', and any interactions involving these speakers and the other 'white' speakers will require leading dashes to highlight the change of speaker.

The colours are assigned to the groups of characters as follows.

With four colours, there could be in excess of $10^{12}$ potential colouring schemes so it is clearly not practicable to search them all. Fortunately, it is possible to identify groupings that are likely to contribute to a good colouring scheme and thus reduce the search space dramatically.

A grouping whose speakers have a large number of interactions with other speakers is a 'good' candidate for having a colour allocated to it. It is also necessary to prioritise groupings containing speakers that are 'rare' in the list. For example, lots of groupings may have large numbers of interactions but there may only be a few that include a particular 'problem' speaker; these should be moved towards the top of the list to ensure they are considered.

The groupings identified as above are sorted according to a weighted combination of the following factors:

the number of interactions between speakers in the group and other speakers, that is, the number of interactions that will not have to be white-white as a result of using this group for a colour;

the number of words spoken by the speakers within the group; that is, the more the better; and the rarity of the speakers in the group, groups which contain rare speakers being favoured.

It is important that the groupings list retains groups that are subsets of others. Whilst it might appear that larger groups are better, this is not necessarily the case. As a simple example, consider five speakers: A, B, C, D and E, and say ABC and CDE are valid groupings. They cannot be used together in a colour scheme because they share speaker C. If subsets AB and DE are available, combinations are then possible.

Combinations of groupings, that is the candidate colour schemes, are scored according to a weighted combination of:

the number of remaining white-white interactions (the fewer the better);

the number of words coloured white (the more the better, for readability).

By sorting the groupings list with consideration of the above points, very good results can be obtained from a search of only a few thousand schemes. Although this cannot guarantee to find the best colouring scheme, experiments have shown that extending the search (at the expense of longer processing times) only gave very small improvements.

Because this algorithm searches a number of possibilities, it can be adapted to use any definition of a 'good' colouring scheme.

Improvements on the Basic Colouring Scheme

One aim of the colouring scheme is to minimise the number of subtitles in which more than one speaker's words are coloured white. As described, the colouring algorithm considers all interactions between speakers when considering candidate colour schemes. An improvement can be made by only considering those interactions which are likely to end up in one subtitle. By performing the colouring process after the alignment process has been completed, interactions that are separated in time can be ignored and a more optimal colouring scheme can be found.

The groupings algorithm described above also has some limitations. Firstly, it does not cater for manual colour assignments and, secondly, it can occasionally find itself swamped by millions of candidate groupings. 'Manual assignments' means that the user should be able to override the colours for one or more of the speakers, that is, specify a predetermined colour for them. The algorithm can be improved to allow this as follows.

The groupings list is changed in two ways. Firstly, instead of beginning with one grouping per speaker and then looking for combinations, all speakers manually assigned the same colour are put into a single grouping. This prevents similarly coloured speakers ever being separated. Secondly an additional constraint is imposed on the generation of combinations, namely that groups must not be combined to make a new grouping if they contain speakers with differing manual colour assignments.

Then, whereas a valid colouring scheme previously required any combination of four non-overlapping groupings, it must now be ensured that the final scheme includes all the user-defined speakers, and that the colours match the user's selections.

The process is best illustrated by example. Consider a programme with five speakers, A, B, C, D and E. The user assigns 'yellow' to A and B and 'cyan' to D. For simplicity, assume that they all appear in separate scenes.

The initial list of groupings will contain AB, C, D and E, forcing A and B to be considered together. Combinations will then be generated, producing the complete list:

AB, C, D, E, DE, CD, CE, CDE, ABC, ABE, ABCE, (null). All groups containing AB will be marked 'yellow' (shown with italics) and all groups containing D will be marked 'cyan' (shown with solid underline). No group contains the combination ABD.

In selecting a colour scheme with four colours, the software must choose four groupings, including exactly one of the 'yellow' groups and one of the 'cyan' groups. A few valid choices are:

AB, C, D, E
AB, C, DE, (null)
AB, D, CE, (null)
AB, CDE, (null), (null)
ABCE, D, (null), (null)

Out of these, the software would probably select the third option, with white as the third colour since white text is more readable.

Some programmes have a large number of speakers with very little interaction between them. This situation can result in a huge number of possible groupings, consuming vast amounts of memory. For example, there may be 40 or so speakers in total but rarely more than three together at any one time. There is little interaction outside these small groups. The general problem is where there are many speakers with few 'clashes'. To overcome this problem, any speaker with fewer clashes than there are colours need only be given a colour once the other speakers have been satisfied. Thus, with little extra processing, such speakers can be left out of the groupings list and assigned colours in a new final stage.

Scene Change Detection

Figure 3:
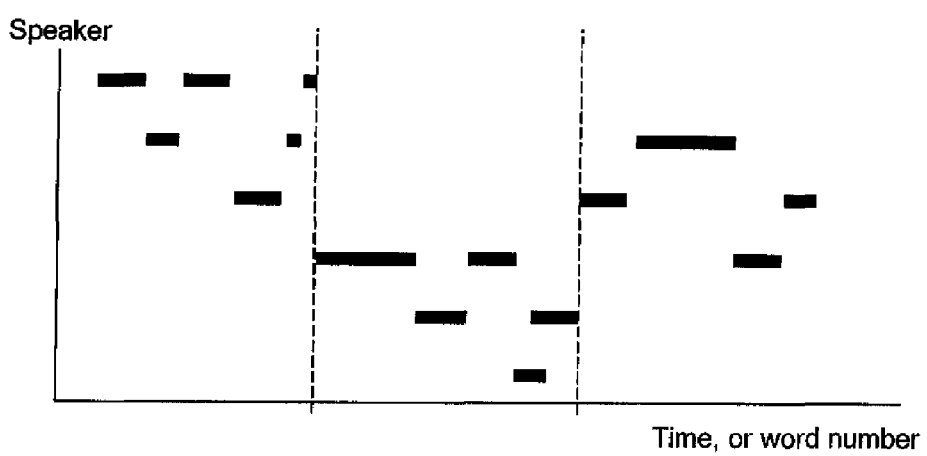
FIG. 3 illustrates a method of detecting scene changes in accordance with an aspect of this invention.

A starting point for finding 'scene changes' is a graph of speaker against time. Such a graph might appear as shown in FIG. 3. In this figure, the dotted lines indicate logical places for scene changes where the group of active speakers changes. Determining these first of all requires filtering horizontally to ignore individual interactions.

We propose the use of an algorithm which effectively constructs a matrix representing the diagram of FIG. 3 and then filters horizontally (i.e. in time) with a Gaussian or similar averaging function. The Gaussian's width is set to 1/16 of the total word count and it decays to a value of 0.01 at its extremes. The filter output is then numerically differentiated with respect to the word number and the absolute values of the result are summed across the list of speakers. This gives a 'scene change indicator' (SCI) function that ranges between 0.0 and 2.0, with peaks roughly corresponding to scene changes. The function can be written as:

$$SCI(w) = \sum_s \left| \frac{\partial}{\partial w} \{M(w, s) * g(w)\} \right|$$

where:
SCI(w) is the 'scene change indicator' value for word 'w',
M(w,s) represents the matrix that indicates whether speaker 's' says word 'w',
g(w) is the windowed Gaussian function, and
* is the convolution operator.

In fact, the implementation can make a much simpler calculation because each word is spoken by exactly one speaker. It is also for this reason that the SCI value never exceeds 2.0. 'Scene changes' are inserted at peaks in the SCI function that stand out from the 'noise' by more than a certain threshold, and that reach close to 2.0.

The SCI peaks are not word accurate due to the effects of other scene changes nearby. The software should therefore move the estimated scene changes to a suitable change of speaker. Consider the speakers A, B, C, D and E. If they speak in a sequence ABACADADEDA, we would not wish to insert a scene change so as to produce ABACAD in one scene and ADEDA in the next; speaker D then appears in both scenes. The best place to put the scene change is where the number of distinct speakers to the left plus the number on the right is at a minimum. For the example given, this value is 4+3=7. Inserting the scene change in the 'correct' place to give ABACA and DADEDA gives a value of 3+3=6. The software therefore preferably searches a certain amount both ways from an initial estimated scene change, looking for a minimum in this value.

Figure 4:
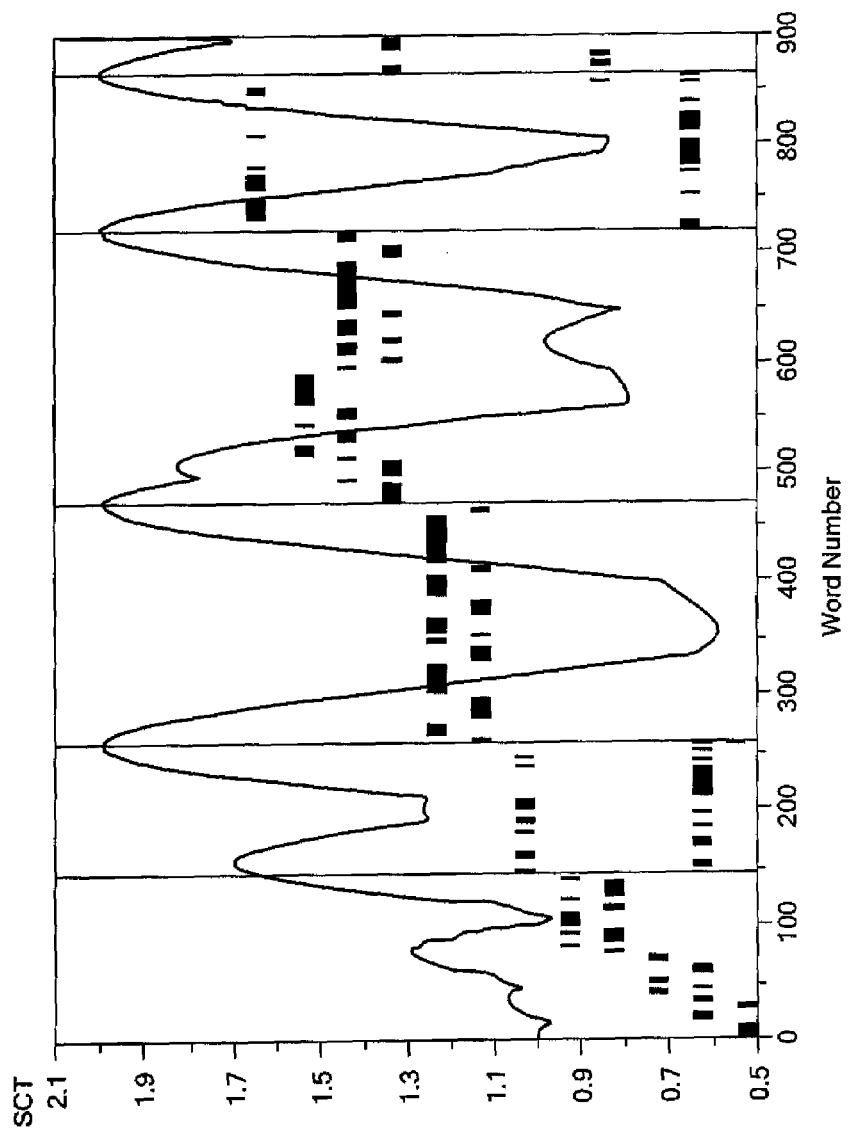
FIG. 4 is a diagram showing an example of the use of the method of FIG. 3.

As an example, FIG. 4 represents the first 900 words of a television programme. The horizontal axis shows the word number and the vertical positions of the black rectangles indicate the different speakers, as before. The superimposed curve is the value of the 'scene change indicator' function and the vertical lines show the positions of the detected scene changes. This particular programme does indeed have scene changes at every point shown. However, the algorithm has missed the first scene change, which occurs at about 80 words. This is due to it being very close to the beginning of the programme when compared to the Gaussian window width of about 300 words. However when the algorithm is used to assist colour allocation, the actual accuracy of the scene change detection is not of paramount importance; all that is required for good colouring is a set of scene changes that is reasonable. However, having too few scene changes will cause more white to white interactions due to reduced colour availability. Too many will allow colours to be re-used quickly and this may confuse the viewer.

As mentioned above, the various improvements incorporated in the preferred embodiment described can be used independently or in various sub-combinations. When used together they provide a particularly effective largely automated subtitling system for audiovisual material, such as television programmes.

The invention claimed is:
1. A method of parsing an electronic text file to identify different components thereof, comprising:
identifying blocks of text in an input electronic text file;
providing a plurality of possible script format properties for the blocks;

providing a definition of each of the possible components of the text file;

in relation to each block, determining the value of each script format property;

for each block, determining from the script format properties of the block and the component definitions a probability value that the block is each of the component types;

selecting the component type for each block on the basis of the probabilities being each of the component types; and generating output file based on the selecting.

2. A method according to claim 1 wherein determining probability values comprises determining probability values using Bayes' theorem.

3. A method according to claim 1, further comprising parsing the output file to identify different components in the output file.

4. A method according to claim 1 wherein providing a definition comprises providing an adaptively changeable definition.

* * * * *

UNITED STATES PATENT AND TRADEMARK OFFICE
CERTIFICATE OF CORRECTION

PATENT NO. : 7,191,117 B2
APPLICATION NO. : 10/297692
DATED : March 13, 2007
INVENTOR(S) : Kirby et al.

It is certified that error appears in the above-identified patent and that said Letters Patent is hereby corrected as shown below:

On the Title Page Item -75- Inventors: delete "David Graham Kirby, Epson (GB)" and replace with --David Graham Kirby, Surrey (GB)--.

On the Title Page Item -75- Inventors: delete "Christopher Edward Poole, Reigate (GB)" and replace with --Christopher Edward Poole, Surrey (GB)--.

On the Title Page Item -57-, line 1 delete "Colors" and replace with --Colours--.

Column 2, line 64 delete "invention we" and replace with --invention, we--.

Column 3, line 18 delete "information the" and replace with --information, the--.

Column 3, line 19 delete "can in particular be" and replace with --can, in particular, be--.

Column 3, line 25 delete "so the" and replace with --so, the--.

Column 3, line 45 delete "invention scene" and replace with --invention scene--.

Column 3, line 55 delete "invention we" and replace with --invention, we--.

Column 3, line 58 delete "invention we" and replace with --invention, we--.

Column 3, line 62 delete "of present invention we" and replace with --of the present invention, we--.

Column 5, line 39 delete "programmes a" and replace with --programmes, a--.

Column 6, line 31, insert the following text:
 --In the generation of the subtitles, other techniques described in our earlier application can also be employed.--.

Column 6, line 49 delete ". Furthermore typing" and replace with --. Furthermore, typing--.

Column 7, line 1 delete "directions for example may" and replace with --directions, for example, may--.

Column 7, line 6 delete "problems we" and replace with --problems, we--.

UNITED STATES PATENT AND TRADEMARK OFFICE
CERTIFICATE OF CORRECTION

PATENT NO. : 7,191,117 B2
APPLICATION NO. : 10/297692
DATED : March 13, 2007
INVENTOR(S) : Kirby et al.

It is certified that error appears in the above-identified patent and that said Letters Patent is hereby corrected as shown below:

Column 8, line 10 delete "change" and replace with --changed--.

Column 9, line 41 delete "script consider" and replace with --script, consider--.

Column 9, line 51 delete "scores" and replace with --scores.--.

Column 9, line 63 delete "continuations" and replace with --continuations.--.

Column 9, line 64 delete "programme this" and replace with --programme, this--.

Column 10, line 11 delete "word then" and replace with --word, then--.

Column 10, line 32 delete "explanation it" and replace with --explanation, it--.

Column 10, line 27 delete "first a" and replace with --first, a--.

Column 11, line 45 delete ", 10" "and replace with --, 10'--.

Column 11, line 47 delete "rout" and replace with --route--.

Column 11, line 49 delete "rout" and replace with --route--.

Column 11, line 50 delete "rout" and replace with --route--.

Column 11, line 51 delete "rout" and replace with --route--.

Column 11, line 52 delete "rout" and replace with --route--.

Column 11, line 56 delete "search the" and replace with --search, the--.

Column 12, line 57 delete "other" and replace with --others--.

Column 12, line 58 delete "former the" and replace with --former, the--.

Column 13, line 56 delete "subtitles a" and replace with --subtitles, a--.

Column 14, line 14 delete "lines the" and replace with --lines, the--.

UNITED STATES PATENT AND TRADEMARK OFFICE
CERTIFICATE OF CORRECTION

PATENT NO. : 7,191,117 B2
APPLICATION NO. : 10/297692
DATED : March 13, 2007
INVENTOR(S) : Kirby et al.

It is certified that error appears in the above-identified patent and that said Letters Patent is hereby corrected as shown below:

Column 14, line 18 delete "text another" and replace with --text, another--.

Column 16, line 39 delete "done the" and replace with --done, the--.

Column 16, line 66 delete "function See" and replace with --function. See--.

Column 18, line 20 delete ". Foe" and replace with --. For--.

Column 19, line 49 delete "Stage 3 the" and replace with --Stage 3, the--.

Column 22, line 57 delete "together they" and replace with --together, they--.

Signed and Sealed this

Twenty Second Day of April, 2008

JON W. DUDAS
*Director of the United States Patent and Trademark Office*